(12) United States Patent
Willars et al.

(10) Patent No.: US 8,600,349 B2
(45) Date of Patent: Dec. 3, 2013

(54) METHODS AND SYSTEMS FOR OBSCURING NETWORK TOPOLOGIES

(75) Inventors: Per Willars, Vaxholm (SE); Johan Bolin, Spanga (SE); Torbjorn Wigren, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 175 days.

(21) Appl. No.: 13/002,817

(22) PCT Filed: Feb. 11, 2009

(86) PCT No.: PCT/SE2009/050146
§ 371 (c)(1),
(2), (4) Date: Jan. 6, 2011

(87) PCT Pub. No.: WO2010/005363
PCT Pub. Date: Jan. 14, 2010

(65) Prior Publication Data
US 2011/0116632 A1    May 19, 2011

Related U.S. Application Data

(60) Provisional application No. 61/078,849, filed on Jul. 8, 2008.

(51) Int. Cl.
*H04M 3/16* (2006.01)

(52) U.S. Cl.
USPC ........... 455/410; 455/411; 455/444; 455/449; 455/422.1; 455/443; 370/254

(58) Field of Classification Search
USPC ................. 455/410, 411, 444, 446, 443, 449, 455/422.1, 423, 424, 428, 560; 370/254
See application file for complete search history.

(56) References Cited

U.S. PATENT DOCUMENTS

| | | | | |
|---|---|---|---|---|
| 6,069,956 A | * | 5/2000 | Kurihara | 380/212 |
| 6,879,832 B1 | * | 4/2005 | Palm et al. | 455/445 |
| 7,443,819 B2 | * | 10/2008 | Hempel et al. | 370/331 |

(Continued)

FOREIGN PATENT DOCUMENTS

| JP | EP1657950 | * 11/2005 |
|---|---|---|
| WO | 2008025013 A2 | 2/2008 |

OTHER PUBLICATIONS

Ernst, T., "Network Mobility Support Goals and Requirements", IETF, Network Working Group, Request for Comments: 4886, Jul. 2007, retrieved from the internet on Oct. 6, 2009, pp. 1-13.

*Primary Examiner* — Kamran Afshar
*Assistant Examiner* — Mong-Thuy Tran
(74) *Attorney, Agent, or Firm* — Rothwell, Figg, Ernst & Manbeck, P.C.

(57) ABSTRACT

Node, computer software and method for preventing an external party (114) to map an identity of a network cell (122) of a telecommunication network (112 or 120) with a corresponding geographical location of the network cell (122). The method includes receiving at a base station (200) of the telecommunication network (112 or 120) system information from a radio network controller (203) of the telecommunication network (112 or 120); extracting, at the base station (200), the identity of the network cell (122) from the received system information; changing, at the base station (200), the identity or one of multiple parts of the identity of the network cell (122); and sending the changed identity or the one of multiple parts of the identity to a user terminal (80).

19 Claims, 9 Drawing Sheets

(56) References Cited

U.S. PATENT DOCUMENTS

| | | | |
|---|---|---|---|
| 8,064,884 B2* | 11/2011 | Wu et al. | 455/412.2 |
| 8,078,144 B2* | 12/2011 | Funnell et al. | 455/410 |
| 8,139,660 B2* | 3/2012 | Anigstein et al. | 375/260 |
| 2006/0030294 A1* | 2/2006 | Funnell et al. | 455/410 |
| 2006/0121907 A1* | 6/2006 | Mori et al. | 455/447 |
| 2007/0218920 A1* | 9/2007 | Bolin | 455/456.1 |
| 2008/0039141 A1* | 2/2008 | Claussen et al. | 455/561 |
| 2008/0076386 A1* | 3/2008 | Khetawat et al. | 455/410 |
| 2008/0201478 A1* | 8/2008 | Yao et al. | 709/227 |
| 2009/0047956 A1* | 2/2009 | Moe et al. | 455/436 |
| 2009/0131038 A1* | 5/2009 | MacNaughtan et al. | 455/422.1 |
| 2009/0228708 A1* | 9/2009 | Trostle | 713/171 |
| 2010/0272070 A1* | 10/2010 | Quilty et al. | 370/332 |

* cited by examiner

METHODS AND SYSTEMS FOR OBSCURING NETWORK TOPOLOGIES

RELATED APPLICATION

This application is a 35 U.S.C. §371 National Phase Entry Application from PCT/SE2009/050146, filed Feb. 11, 2009, and designating the United States, and claims priority from U.S. Provisional Patent Application Ser. No. 61/078,849, filed on Jul. 8, 2008. The above-mentioned applications are incorporated by reference herein.

TECHNICAL FIELD

The present invention generally relates to radio communication systems, devices, software and methods and, more particularly, to mechanisms and techniques for obscuring network topologies associated therewith.

BACKGROUND

Mobile phones and services on mobile handsets (as used herein the terms "mobile handsets" and "mobile terminals" also refer to embedded devices in, e.g., PCs, laptops, vehicles, etc.) have had a remarkable evolution over the last few decades. When 3GPP (third generation partnership project) standardized Global System for Mobile communications (GSM) and later Third Generation (3G) during the late 80's and 90's, circuit switched telephony and later Short Message Service (SMS) were pretty much the only services available. Recently, mobile handsets and their networks have evolved to powerful devices capable of running local application and browser based services, connected to a network providing a bandwidth high enough for TV and interactive multimedia. With the increasing bandwidth, and corresponding need to provide a feasible technical platform and transport technology for multimedia services, packet switched networks using Internet Protocol (IP) as the fundamental technology is becoming the dominating platform for mobile services.

With the increasing bandwidth, advanced mobile handset and IP connectivity, functionality that earlier has been implemented as tightly integrated functionality in the operator's network with thin clients (i.e., clients having handsets with poor processing and memory storage capabilities that use control channels for communication with the network), is today also available for applications located in the IP domain in the operators network or even outside the operators network, for the relatively thicker client (i.e., clients having handsets with competitive processing capabilities and large memory storage). As the thicker clients' communications with a server in the network often requires (i) information about the network and/or (2) native functionality existing in the handset to function correctly, there are interfaces and protocols which provide this type of information. The functionality and information is to a large extent what is often referred to as the control plane, while the communication between a client on the handset and a server in the network based on packet based technology (typically IP) usually is referred to as the user plane.

Figure 1:
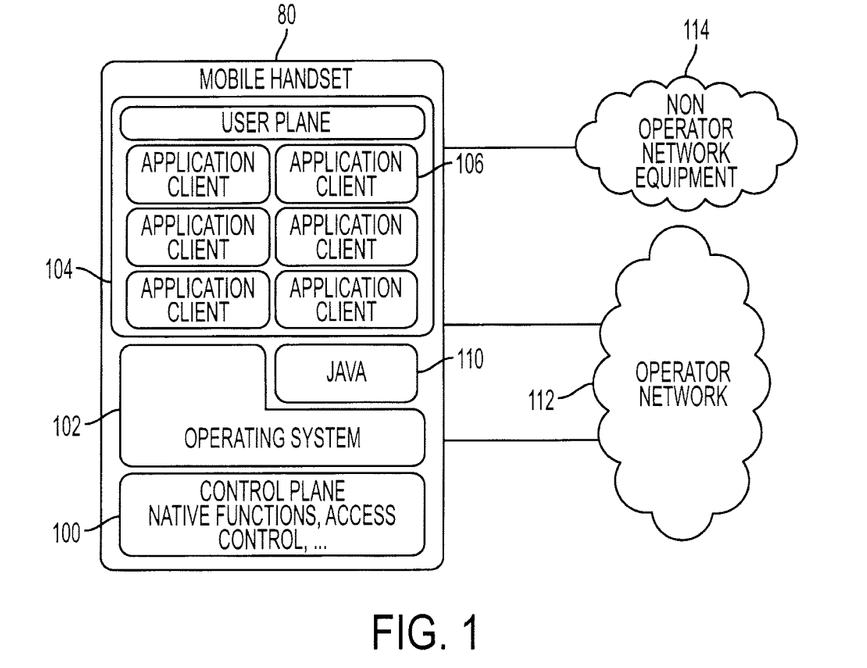
FIG. 1 is a schematic diagram of a terminal being configured to have a user plane and a control plane.

The user plane and control plane architecture of a handset 80 is discussed with regard to FIG. 1, which is disclosed in U.S. patent application Ser. No. 12/346,066, entitled "Abstraction Function for Mobile Handsets," to J. Bolin et al, the entire content of which is incorporated herein by reference. FIG. 1 illustrates a conceptual view of a typical mobile handset 80. Therein, a bottom layer 100 represents the control plane, which provides the core functionality of the mobile handset 80, e.g., communications with the mobile phone via control signalling used to manage the connection, mobility and also some of the basic services (e.g., call control and SMS). On top of the control layer 100 may be the operating system OS 102, which manages the phone's functionality and provides the interface to functionality for applications and clients in the user plane 104. Clients and/or applications 106, such as browsers, calendar and games, are examples of services implemented in the user plane 104, on top of the operating system 102.

The mobile phones may also include a Java Virtual Machine (JVM) 110. The JVM 110 may run on top of the operating system 102 and enables Java based applications to run on the handset 80. There are various JVMs which are adapted for platforms with different computing capacity and characteristics. One common JVM for mobile handsets is known as the Java Micro Edition, J2ME. J2ME provides a number of application programming interfaces (APIs) for application developers to use when developing applications for mobile handsets.

Thus, the J2ME environment is advantageous for those developers that are not associated with a certain operator but intend to deploy applications on handsets subscribing to a certain operator. The exemplary embodiments describe how to allow these developers to access the sensitive information from the control plane when the operator has a relationship with the developers and how to deny other developers and/or operators to access the information in the control plane when these later developers and/or operators are not authorized to access that data. Java may be used, for example, to reduce the amount of customization of applications associated with different handset models, since the Java APIs used for different handset models are relatively similar to one another. Other OS may be used instead of JVM as discussed later.

As mentioned earlier, the user plane 104 is disposed above the operating system 102 and Java 110. The user plane 104 may include one or more applications and/or clients 106. One difference between a client and an application may be that an application provides a service to the user while the client may perform a function for the network and not a direct service to the user, i.e., the client has a low level functionality to the user. These applications and clients 106 may use the communication channels of the user plane for exchanging data with the operator's network or with third parties. Such communication channels may be General Packet Radio Services (GPRS) and TCP/IP. These channels may be used to communicate with application and content servers 112, inside the operator's network (control domain) or servers 114, which are outside the operator's domain (e.g., Internet servers).

Applications 106 may access information and functionality in the handset 80 either via the operating system 102 or Java 110. Additionally or alternately, a natively installed client 106, such as the OMA (Open Mobile Alliance) SUPL (Secure User Plane Location) client, may be provided in the user plane to access information in the control plane. Thus, an application or client 106 in the handset 80 can extract, via APIs in the operation system (OS) 102 and Java 110, but also by using native clients such as the OMA SUPL 106, information from the control plane or invoke functionality and send this to servers 114 outside the operator's network 112.

There are a number of reasons why the user plane/control plane architecture is being supported by most actors in the business. One is that third parties will start to develop applications and, just as in the case with Internet, this will be helpful to the expected success of future systems. Another is that IP provides a technology platform where it is cheaper to deploy functionality. This is to a large extent due to economy of scale, as technology also used by the IT industry is cheaper than traditional telecom technology.

However, the existing interfaces expose the native functionality and network information in such systems to the third parties without offering the operator of the network a capability to selectively provide that information to desired third parties, i.e., parties that are entitled to receive that information. In other words, the existing interfaces could not offer the network's operator the possibility to selectively decide which third party to access the network information and/or the native functionality. This selectivity may be decided, for example, based on a license agreement between the third party and the network's operator.

For example, the OS typically provides information regarding most of what is available in the handset. Symbian, Nokia Series 60, Windows Mobile and Linux are examples of OSs that provides interfaces for services and information in the control plane. Examples of such services and information include Call Control, SMS/MMS service, as well as network information such as the base station ID that a mobile terminal is currently attached to, neighbour list and active/passive set. In addition to the interfaces provided by the OS, Java (J2ME) also provides a wide set of standardized interfaces which enable a Java application to obtain access to the services and information associated with mobile terminals.

Since implementing services as user plane based services, rather than control plane based services, typically results in lower investment cost and shorter time to market, OMA have standardized service enablers based on user plane signaling. One example of this is user plane based positioning standardized in OMA Secure User Plane Location (SUPL). In SUPL a SUPL client in the terminal accesses network information and positioning capability. The client may communicate with a SUPL Server using IP and a provisioned IP address. As a consequence of the application in the user plane being able to freely access the network information in the conventional terminals, it is possible for a third party to monitor and create mappings of the network topology to the geographical position of the terminals, i.e., outside of the network owner's technical and economical domain.

Thus, when information such as the Cell-ID is available to applications in the user plane, other actors than the operator can monitor and register the information and use it to compete with the operator, for example, to gain business advantages. One example of such competitive use is that of independent actors (not related or in a relationship with the operator) providing user positioning services and statistics, using the operator's infrastructure. Another competitive use is that of competing operators monitoring and keeping registers of competing operator's network infrastructure for business intelligence. In addition to these commercial examples, there are also some countries in which the information, such as cell planes, is supposed to be kept secret due to national security reasons. As the information as such, e.g. the Cell-ID, often is used in a large number of nodes and systems in the operators network (e.g. access and routing control, user management and charging etc.), this information should be properly controlled by the operator to be available to the permitted services and/or clients and also to the equipment within the network.

Accordingly, it would be desirable to provide devices, systems and methods that avoid the afore-described problems and drawbacks.

SUMMARY

According to an exemplary embodiment, there is a method for preventing an external party to map an identity of a network cell of a telecommunication network with a corresponding geographical location of the network cell. The method includes receiving at a base station of the telecommunication network system information from a radio network controller of the telecommunication network; extracting, at the base station, the identity of the network cell from the received system information; changing, at the base station, the identity or one of multiple parts of the identity of the network cell; and sending the changed identity or the one of multiple parts of the identity to a user terminal.

According to another exemplary embodiment, there is a base station of a telecommunication network configured to prevent an external party to map an identity of a network cell of the telecommunication network with a corresponding geographical location of the network cell. The base station includes a communication interface configured to receive system information from a radio network controller of the telecommunication network, and a processor. The processors is configured to, extract the identity of the network cell from the received system information, change the identity or one of multiple parts of the identity of the network cell, and send the changed identity or the one of multiple parts of the identity to a user terminal.

According to still another exemplary embodiment, there is a computer readable medium including computer executable instructions, wherein the instructions, when executed, implement a method for preventing an external party to map an identity of a network cell of a telecommunication network with a corresponding geographical location of the network cell. The method includes receiving at a base station of the telecommunication network system information from a radio network controller of the telecommunication network; extracting, at the base station, the identity of the network cell from the received system information; changing, at the base station, the identity or one of multiple parts of the identity of the network cell; and sending the changed identity or the one of multiple parts of the identity to a user terminal.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Reference throughout the specification to "one exemplary embodiment" or "an exemplary embodiment" means that a particular feature, structure, or characteristic described in connection with an embodiment is included in at least one embodiment of the present invention. Thus, the appearance of the phrases "in one exemplary embodiment" or "in an exemplary embodiment" in various places throughout the specification is not necessarily all referring to the same embodiment. Further, the particular features, structures or characteristics may be combined in any suitable manner in one or more embodiments.

As mentioned above, existing interfaces to control plane information and functionality enable user plane services to obtain access to information from the control plane, and this information can be exported to entities outside the operators domain. Because this information may include, among other things, identities of base stations (which include, for example, country code, operator code, location area, and base station unique identity), a party outside an operator's network can create a database which contains the operator's network topology.

By using a positioning mechanism (e.g., GPS or an operator provided positioning service), the operator's network topology can also be associated with a geographical reference. When such a mapping is performed, the base station identity (Cell-id) available in the phone can be used to associate the handset with a geographical location. This association can then be used in a wide set of services for the end user or simply for data mining. Examples of such services include user plane positioning according to OMA SUPL and IP Multimedia Subsystem services.

In order for a geographical mapping of the network topology to work well to detect users locations, topology maps are needed which are relatively reliable. If the topology information continuously changes, such databases will have difficulty maintaining the required level of accuracy. According to exemplary embodiments, mechanisms are described herein to make it more difficult (i.e., for other third parties other than the operator/owner of a network or licensed third parties) to determine a valid mapping between network topology and geographical location. This may be achieved by, for example, providing for dynamic changes in the topology related information which is available in the handset, e.g., the Cell-ids.

Figure 2:
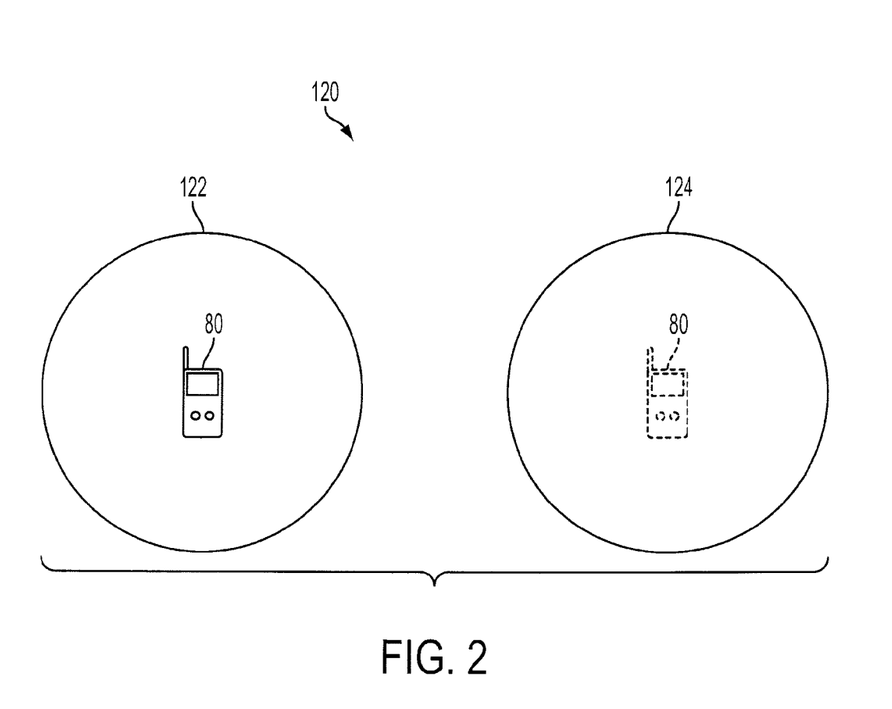
FIG. 2 illustrates a communication network having at least two cells.

According to one exemplary embodiment, a network may be constantly re-planned. This means that the actual cell plan of the mobile communication system is constantly changed. All cells do not have to be changed all the time, but a sufficient number of cells are dynamically changed to make topology databases outside the operator's domain outdated (i.e., too outdated to provide a sufficient QoS). For example, as shown in FIG. 2, suppose that a system (telecommunication network) 120 includes a user terminal 80, which is geographically located in cell 122, and at least another cell 124. Also suppose that an identity of cell 122 is Cell-id-122 and an identity of cell 124 is Cell-id-124. Based on certain criteria that will be discussed later, the network may determine to change the identity of cell 122 to Cell-id-124, which was the identity of cell 124 or to generate a brand new Cell-id. This cell identity change may be performed in various ways, for example, cells 122 and 124 simply swap their identities or cell 122 receives the identity of cell 124, cell 124 receives the identity of cell 126, and so on, or the cells may receive new identities, or a combination of these possibilities. Now, when the third party extracts the cell identity Cell-id-124 from the user terminal 80, not knowing about the changed cell identity, would wrongly associate the geographical position of user terminal 80 with the geographical location of cell 124, which are different. However, a third party that is authorized by the operator of the network, will be provided with the cell identity change and will still be able to determine the correct location of the user terminal 80. As can be seen, not all cells have to undergo an identity change in order to prevent the unauthorized third users from accurately determining the locations of the user terminals.

When this method is used all network elements needing the cell plan will be affected by the changes (this does however not mean they need any functional upgrade). Thus, one disadvantage of this method is the need to update the identity information of all the network elements and the risk associated with failing to do so for each network element.

Figure 3:
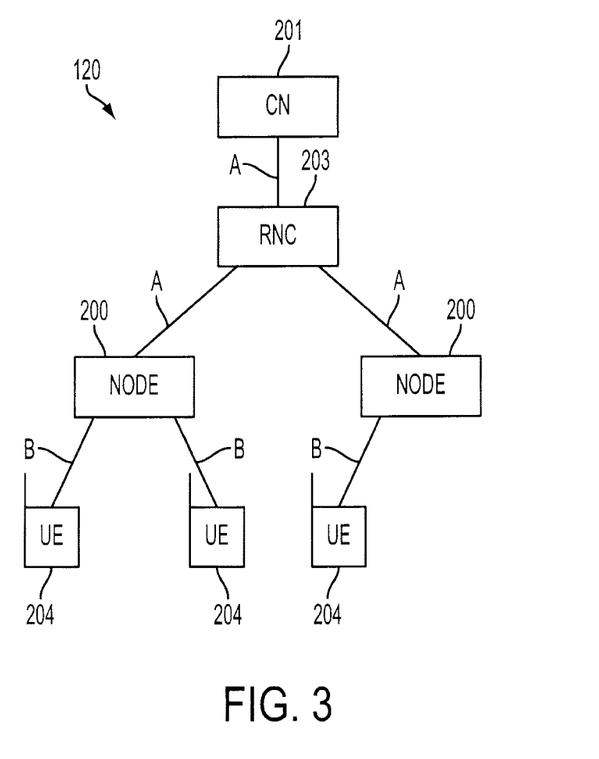
FIG. 3 illustrates a communication network having at least two base stations.

According to another exemplary embodiment, the data associated with the cell plan of the network may be scrambled. In one application just the base station and the handset notice the changed data. In another application, it is possible to constantly (or randomly) change the transmitted identifiers of the base stations at all of the lower nodes in the system, e.g., base stations and mobile terminals, but to maintain the identities of the cells in all nodes above the base station. For example, as shown in FIG. 3, a Wideband Code Division Multiple Access (WCDMA) system 120 may include a core network CN 201 connected to a radio network controller RNC 203. The RNC 203 may control one or more NodeBs 200. Each NodeB 200 is communicating with one or more user terminals 204. The communication links A between the CN 201, RNC 203, and NodeBs 200 carry the cell identities unscrambled while the communication links B between the NodeBs 200 and the user terminals 204 carry the cell identities scrambled.

Figure 4:
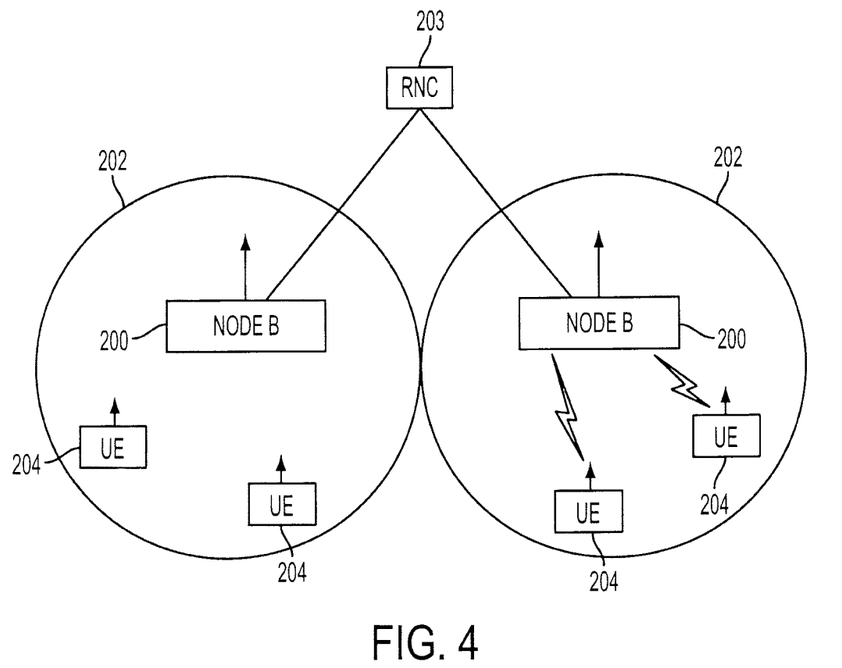
FIG. 4 illustrates an exemplary radio communication network in which exemplary embodiments can be implemented.

Prior to discussing these exemplary embodiments in more detail, and to provide some context for the more detailed discussion of obscuring network topologies according to these exemplary embodiments, consider the exemplary radiocommunication system illustrated in FIG. 4. Beginning with the radio access network nodes and interfaces in FIG. 4, it will be seen that this particular example is provided in the context of WCDMA systems. Nonetheless, the exemplary embodiments are not limited in their applicability to transmitters or transmissions associated with WCDMA systems and can instead be used in any system including, but not limited to Long Term Evolution (LTE), GSM, Universal Terrestrial Radio Access (UTRA), Evolved-UTRA (E-UTRA), High Speed Packet Access (HSPA), UMB, Worlwide Interoperability for Microwave Access (WiMaX) and other, systems, devices and methods. Since, however, the example in FIG. 4 is provided in terms of WCDMA, the network node which transmits and receives over the air interface is termed an NodeB, several of which NodeBs 200 are illustrated therein.

In the context of the air interface, each NodeB 200 is responsible for transmitting signals toward, and receiving signals from, one or more cells 204. Each NodeB may include multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. Note that, as used herein, the phrase "transmit antennas" is specifically meant to include, and be generic to, physical antennas, virtual antennas and antenna ports. The NodeBs 200 are also responsible for many higher functions associated with handling communications in the system including, for example, scheduling users, handover decisions, and the like. The interested reader who desires more information regarding transmit or receive functions associated with WCDMA or other systems in which these exemplary embodiments may be deployed is directed toward the book entitled "3G Evolution—HSPA and LTE for Mobile Broadband", to Erik Dahlman et al., published by Elsevier Ltd., 2007, the disclosure of which is incorporated here by reference.

Briefly, signals are transmitted over an air interface from the NodeB 200's (possibly transferred first through the core network exemplified by radio network controller (RNC) 203 to the NodeBs 200) and then into the cells 202 toward target mobile terminal, stations, or user equipments (UE) 204 in the downlink. Similarly, signals are transmitted from the UEs 204 via an uplink over the air interface to their respective NodeBs 200. In this exemplary WCDMA embodiment, a UTRAN Cell-ID (UC-id) identifies each cell 202 within the whole radio access network (RAN). The UC-id has two portions: the first portion is the RNC-id, which identifies an RNC that controls the cell, and the second portion is the C-id (Cell id) which is unique within the scope of that RNC. The UC-id, or alternatively the C-id, is used within the RAN both for traffic signaling (e.g., handover signaling on Iur (the interface used for communication between different RNCs) and Iub (the interface for communication between the NodeB and RNC) interfaces), and for organizing and management operations (e.g., configuring cell parameters for a given cell, or defining neighbour cell relations).

The UC-id is also broadcasted on the BCCH channel by the NodeBs 200, and is received by the UEs 204. However, in WCDMA, the UC-id is typically not used by the handset for any critical functionality. Instead, the handset identifies the cells by the code of the primary channel CPICH (Common Pilot Channel), which is one out of a maximum of 512 codes. In the radio network signaling between the RAN and the handset, neighbouring cells are identified referring to the primary CPICH code. Because there is a limited amount of possible codes for primary CPICH, there will be cells using the same code within one RAN. Therefore, the RAN has the logic to correlate a given primary CPICH to the proper cell (identified by UC-id), based on the context of the current handset. This is typically realised through the neighbour cell definitions, so that if a handset is currently connected to one cell, and reports a measurement for a primary CPICH of a defined neighbouring cell, the RAN knows exactly which cell has been measured. A neighbour cell definition may exist for each cell and it may be maintained as a list of cells that are neighbours of the given cell. The neighbour cell list includes the identities of the neighbouring cells. The neighbour cell list may be stored at each node or at the RNC or as a combination of these two possibilities.

The handset may use the UC-id to save some battery power, e.g., it would not need to decode all previously received cell information, if later returning to the same cell. However it will be understood from the foregoing that the system will continue to operate properly if the UC-id that is broadcasted is occasionally changed as suggested herein according to exemplary embodiments to aid in obscuring the network topology from third parties.

Figure 5:
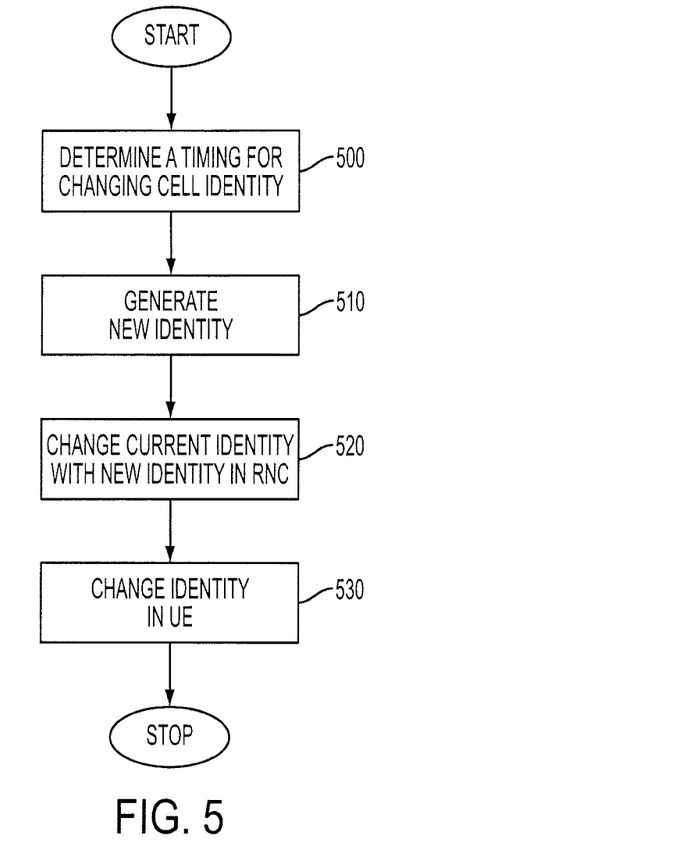
FIG. 5 is a flow chart illustrating steps for changing an identity of a cell according to an exemplary embodiment.

Having described an exemplary system in which exemplary embodiments can operate, the discussion now returns to the first exemplary embodiment in which the cells in a system are periodically re-planned, e.g., assigned a new UC-id, to aid in obscuring the network topology. Thus, according to this exemplary embodiment, a process for replanning the network is illustrated in FIG. 5. The process starts with step 500 in which a timing mechanism triggers the replanning. The timing mechanism may be, for example, a timer. The timer mechanism may be located in the RNC or above. In step 510, a new identity is generated for one or more cells. For simplicity, it is assumed that the identity of only one cell is changed. This cell is called the given cell. In one application, the new identities of the cells are sequentially generated while in another application the new identities of the cells are simultaneously generated. In one exemplary embodiment, identities for plural cells, which are less than all the cells, are generated. However, in another exemplary embodiment, the new identities of all the cells are generated. The term new identity is understood to include generating a brand new identity (which does not exist in the system prior to generating it) and/or reusing an existing cell identity and assigning the existing cell identity as the new identity of another cell, i.e., shifting the cell identities among the existing cells.

In step 520 the current identity of the given cell is changed with the new identity. This change may be performed in a few substeps. For example, in a first substep, neighboring cells of the given cell that undergoes the identity change are identified. In a second substep, the cell configuration of the given cell is changed in the RNC. In a third substep, neighboring cell lists of the neighboring cells, which were identified in the second substep, are updated with the new identity of the given cell. After this substep, the new identity of the given cell is fully implemented in the RNC. In step 530, a portion of the new identity of the given cell is updated in one or more of the base stations.

It is noted that the Primary CPICH, as seen from UEs 204, is not changed during this process according to an exemplary embodiment. In one application, changing the identity of the cell or cells is performed at night-time or any other time when the traffic in the network is low. To change the C-id for a cell in operation, the standardised protocol between RNC and NodeB needs to be changed, e.g., by updating the cell reconfiguration procedure to allow change of C-id. An alternative is to only change the RNC-id and leave the base stations unaffected by this process. Another alternative is to change both the C-id and the RNC-id. The above described exemplary embodiment addressed how an overall identity, including at least two parts, is changed. However, the exemplary embodiments may be applied to a non-WCDMA system that might have the cell identity including only one part or more than two parts. In other words, the part of the cell identity that is changed may coincide with the entire cell identity or may be one of many parts of the cell identity. For simplicity, the exemplary embodiments refer to a cell identity having two parts but this is not intended to limit the exemplary embodiments.

A process for replanning the network is described in patent application Ser. No. 12/346,128, entitled "Methods and Systems for Cell Re-Planning to Obscure Network Topologies," to J. Bohlin and T. Wigren, the entire content of which is enclosed here by reference. This application describes mechanisms for protecting an operator's network topology relation with its geography. This involves, for example, the creation of a list of cells, for a specific, geographically connected part of a cellular network, the list being organised so that geographically close cells will correspond to fixed list indices that are also close, and storage of values of each entry of the organised list. The stored values can include the currently valid code for the cell corresponding to a particular index of the organised list. Operations on the list can result in moving at least two of the codes to new positions in an updated list, such operations including one or more of: shift down 1 step, shift down k steps, shift up 1 step, shift up k steps, pair wise exchange between blocks of adjacent entries of the list, or any of the previous alternatives applied to subsets of the list. Note that the operations may be decided and ordered from one deciding node and then signalled to a set of other depending nodes, wherein the depending nodes maintain the list and the list of neighbour cells, and execute the operations on the list. Alternatively, the deciding node may execute the operations on the list and send the results to the depending nodes.

However, such mechanism recycles the existing codes of the nodes of the network and does not create new codes. Also, this mechanism is a global mechanism that applies to the whole network while the mechanism and method described with regard to FIG. 5 is taking place in a given RNC of the network. Another difference between the mechanism of Ser. No. 12/346,128 and the mechanism of FIG. 5 is that the mechanism of Ser. No. 12/346,128 changes the codes of RNC, base stations and cells among themselves, i.e., the whole network, while the mechanism of FIG. 5 affects the identities of the cells. Furthermore, the mechanism of FIG. 5 may use scrambling keys to protect information of the network, which is different from the mechanism of Ser. No. 12/346,128.

According to another exemplary embodiment, obscuring network topologies can be accomplished without reconfiguration of cell data by instead scrambling this information. Scrambling the information is understood to include encoding, encrypting, mixing up or other know methods to those skilled in the art for protecting the information from unauthorized parties. According to this exemplary embodiment, all UC-ids, C-ids and cell configurations, including neighbour cell configurations, may remain static with respect to most of the network nodes, e.g., the RNC 203 and higher level nodes. Instead, the version of the UC-id that is broadcasted over the air interface to the user terminal, by the network, will be scrambled at regular intervals by the base station, for example, NodeBs 200. Thus, according to this exemplary embodiment, the NodeBs 200 will, when receiving new system information from RNC 203, scramble the UC-id received from RNC 203 with a random scrambling key for transmission. This scrambling process may take place periodically, e.g. every night.

In one exemplary embodiment, the random scrambling key is received by each base station from its corresponding RNC. In another exemplary embodiment, the base station creates a new random scrambling key independent of the RNC. In either embodiment, the random scrambling key is provided, via the network, either to an external server or a server internal to the network. This server may have a list of the third parties that are authorized/licensed to receive the identity of the cells, and thus, the server will provide these third parties with the random scrambling key so that the applications of the authorized third parties may receive the correct topology of the network even when the topology related information is scrambled as discussed above.

Figure 6:
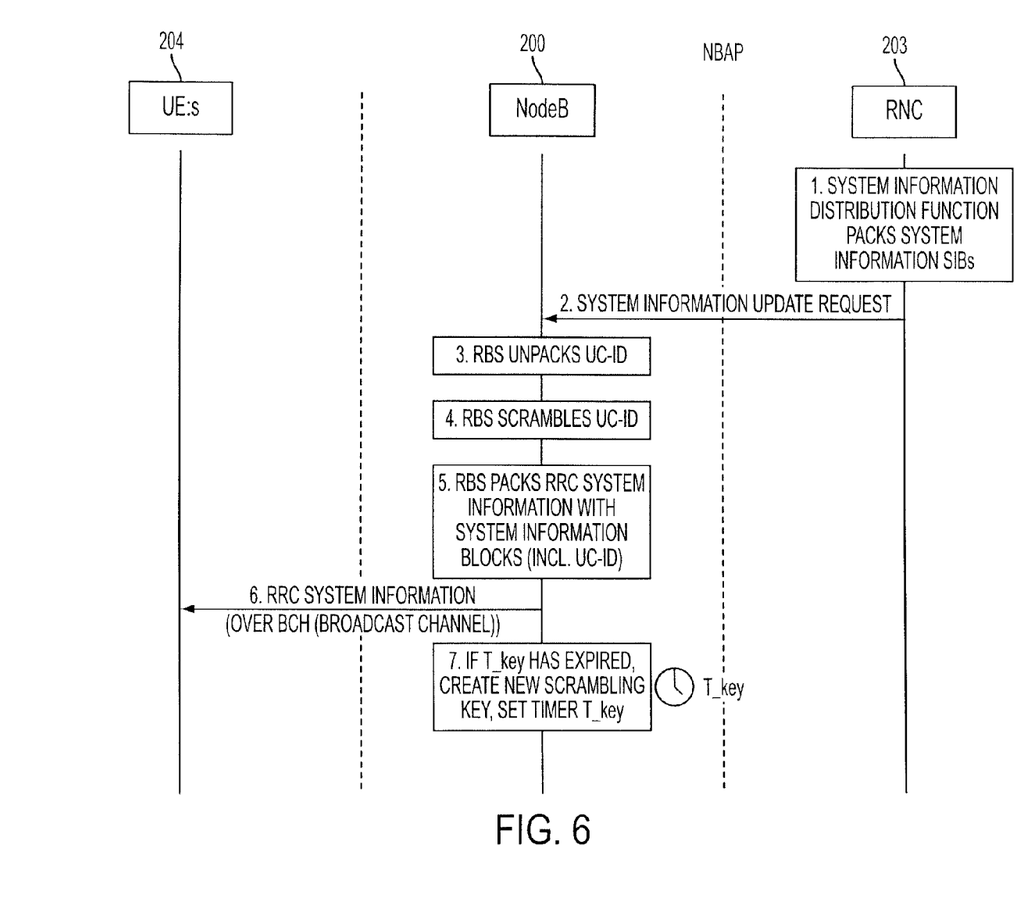
FIG. 6 is a signaling diagram illustrating scrambling of a broadcast cell identifier according to an exemplary embodiment.

To describe this exemplary embodiment in more detail, consider the illustrative signaling diagram of FIG. 6. Therein, the numbered signals operate as described below. In this exemplary embodiment the scrambling key is generated in the base station. In step 1, the RNC 203 assembles the system information to be sent out to the base station. This step may be performed in the system information distribution function of the RNC 203. In step 2 the RNC 203 transmits the system information to the NodeBs 200 (also referred to herein as radio base stations (RBSs)) using a SYSTEM INFORMATION UPDATE REQUEST message over the NodeB Application Part (NBAP) interface (which is a dedicated signalling protocol used by the RNC to control the NodeB) to the receiving RBS. The SYSTEM INFORMATION UPDATE REQUEST is a pre-defined command used in the WCDMA systems. In case of a Drift RNC (DRNC) connection, the message is relayed over the Radio Network Subsystem Application Part (RNSAP) interface (not shown). This transmission is normally performed at an update rate between a few 10s of milliseconds and a minute.

In step 3, the RBS 200 receives the SYSTEM INFORMATION UPDATE REQUEST message and unpacks the UC-Id information. In step 4, the RBS 200 scrambles the UC-Id information with the scrambling key, which is generated/administrated by the RBS 200. In step 5, the RBS 200 packs Radio Resource Control (RRC) System Information in system information blocks (SIBs) received from the RNC 203 and stores it. This includes the scrambled UC-Id. In step 6, the RBS 200 broadcasts the stored information in the RRC SYSTEM INFORMATION message over the BCH channel (broadcast channel) to the user terminal 204. This transmission may be performed every Transmission Time Interval (TTI). As discussed above, the dedicated commands of the WCDMA system are used here for simplicity. However, this method may be adapted to other communication systems.

Therefore, the user terminal 204 receives the identities of the cells UC-Id scrambled and thus, a third party would have to know the scrambling key in order to access the identities of the cells. The RBS 200 may include a timer which is configured to generate a signal at predetermined times or at certain intervals. Based on the signal, the RBS 200 may change a scrambling code used to scramble the identities of the cells. The timer may be configured to randomly provide the signal. After the RBS 200 computes a new scrambling key, the timer T_key is reset. Typically, T_key is set to a value of the order of 24 h.

Figure 7:
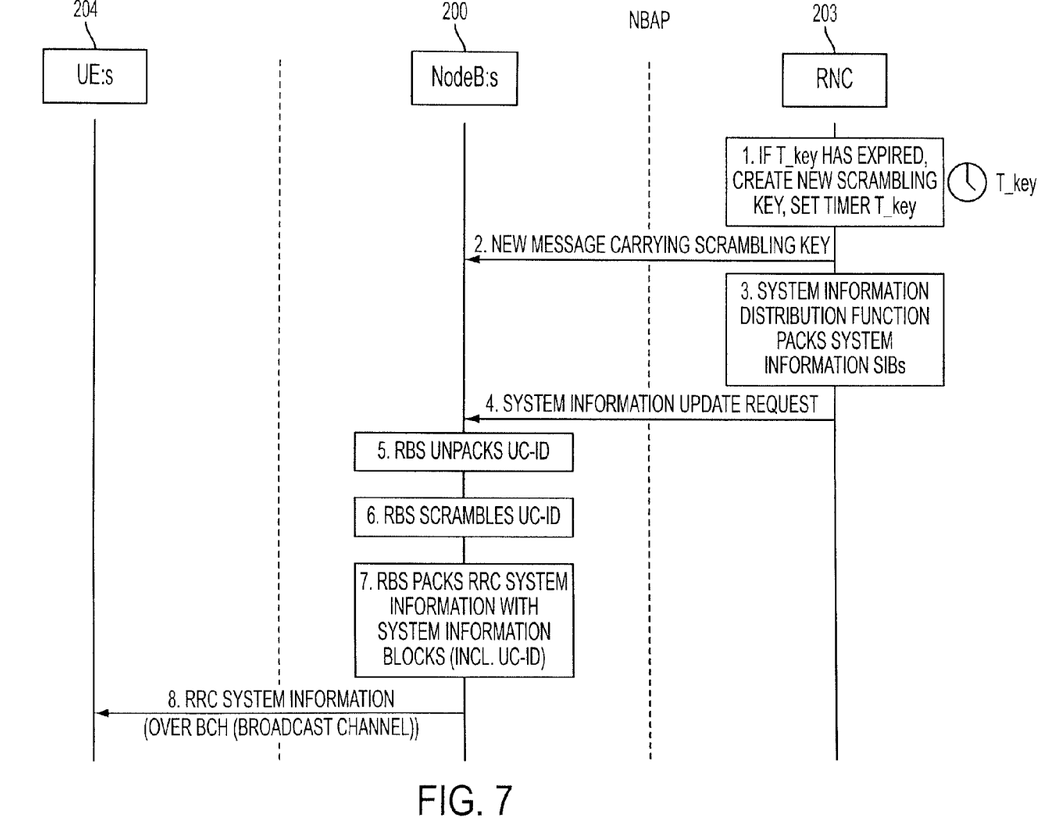
FIG. 7 is a signaling diagram illustrating scrambling of a broadcast cell identifier according to another exemplary embodiment.

According to another exemplary embodiment shown in FIG. 7, the scrambling key is not generated by each base station or NodeB 200, but it is generated centrally for the whole RAN, and distributed to all base stations via a signaling message. This would allow the usage of DRM-like (Digital Right Management) methods to allow selected receivers to decode the content, e.g., third party application providers that are paying the operator, will receive the new key each time the scrambling key is changed. Or, alternatively, paying service providers will receive a master key that is used to create new scrambling keys. This master key can then be provided to the applications from this provider in the handsets, enabling those particular applications to decode a stable UC-id that is exposed by the handset. This alternative exemplary embodiment is shown in the signaling diagram of FIG. 7.

The numbered signals operate as described below. In step 1, the RNC 203 computes a new scrambling key and resets timer T_key. T_key may be set to a value of the order of 24 h. Note that other nodes than the RNC 203 may perform this step. In step 2, the RNC 203 sends the scrambling key to the NodeBs 200 it controls. A NEW MESSAGE signal may be used for this purpose. Still at the level of the RNC 203, the RNC 203 assembles in step 3 the system information to be sent out to the NodeBs 200. This can be done in the system information distribution function of the RNC. In step 4, the RNC 203 transmits the system information to the NodeBs 200 using, for example, a SYSTEM INFORMATION UPDATE REQUEST message over the NBAP interface. In case of a DRNC connection the message is relayed over the RNSAP interface (not shown). This transmission may be performed at an update rate between a few 10s of milliseconds and a minute. In step 5, the RBS 200 receives the SYSTEM INFORMATION UPDATE REQUEST message and unpacks the UC-Id information. In step 6, the RBS 200 scrambles the UC-Id information with its scrambling key, which was received in step 2 from the RNC 203. In step 7 the RBS 200 packs the RRC System Information in system information blocks (SIBs) and stores it. This includes the scrambled UC-Id. In step 7 the RBS 200 broadcasts the stored information including the scrambled UC-Id in the RRC SYSTEM INFORMATION message over, for example, the BCH channel (broadcast channel) to the user terminal 204. This transmission may be performed every TTI.

One difference between the embodiments shown in FIGS. 6 and 7 is that in the embodiment of FIG. 6 the scrambling key is generated and maintained in each base station while in the embodiment of FIG. 7 the scrambling key is generated and distributed by the RNC.

Figure 8:
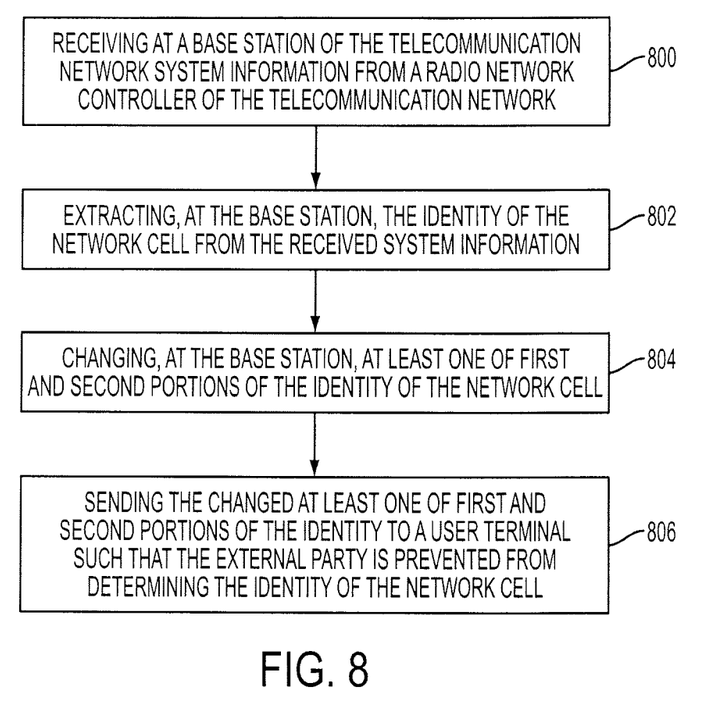
FIG. 8 is a flow chart illustrating steps of a method for preventing an external party to determine an identity of a network cell of a telecommunication network according to an exemplary embodiment.

According to an exemplary embodiment illustrated in FIG. 8, there is a method for preventing an external party to determine an identity of a network cell of a telecommunication network. The method includes a step 800 of receiving at a base station of the telecommunication network system information from a radio network controller of the telecommunication network, a step 802 of extracting, at the base station, the identity of the network cell from the received system information, a step 804 of changing, at the base station, at least one of first and second portions of the identity of the network cell, and a step 806 of sending the changed at least one of first and second portions of the identity to a user terminal such that the external party is prevented from determining the identity of the network cell.

Figure 9:
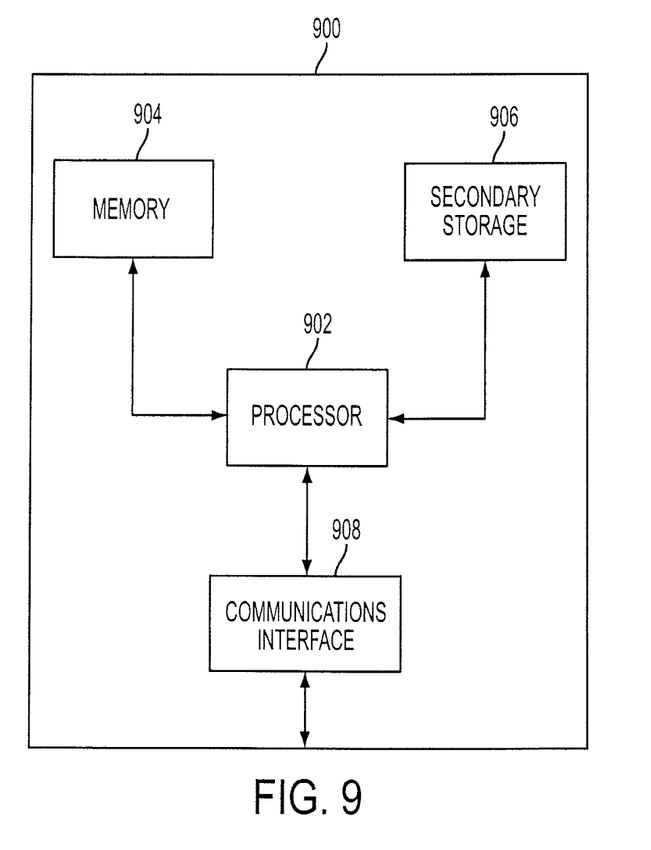
FIG. 9 is a schematic diagram of a node of the telecommunication network.

An exemplary communications node 900 which can be used, for example, to either transmit or receive the above-described signal is illustrated in FIG. 9. Therein, the communications node 900 can contain a processor 902 (or multiple processor cores), memory 904, one or more secondary storage devices 906 and a communications interface 908 to facilitate communications itself and the rest of the network(s). Processor 902 can also perform the above-described operation(s) of scrambling or changing the cell identities, etc., in response to a suitable command. The new or changed cell identities and the scrambling key, etc., may then be stored in memory 904.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user equipment, a base station, a radio network controller and generally in a wireless communication network or system comprising both the user equipment, the base station and a higher level, network node. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user equipment, the base station or any host computer. The user equipment may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor. The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

Thus, it will be apparent that exemplary embodiments also relate to software, e.g., program code or instructions which are stored on a computer-readable medium and which, when read by a computer, processor or the like, perform certain steps associated with transmitting information signals which are abstracted or hidden in the manner described above.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for preventing an external party to map an identity of a network cell of a telecommunication network with a corresponding geographical location of the network cell, the method comprising:
   receiving at a base station of the telecommunication network system information from a radio network controller of the telecommunication network;
   extracting, at the base station, the identity of the network cell from the received system information;
   changing, at the base station, the identity or one of multiple parts of the identity of the network cell; and
   sending the changed identity or the one of multiple parts of the identity to a user terminal, wherein the changing step further comprises:
   generating a new identity for the network cell, wherein the new identity has multiple parts;
   changing in the radio network controller a current identity of the network cell with the new identity; and
   instructing the base station, which is controlled by the radio network controller and which controls the network cell, to replace a current second portion of the current identity with a new second portion of the new identity of the network cell.

2. The method of claim 1, wherein the changing step further comprises:
   receiving at the base station a scrambling key from the radio network controller; and
   scrambling at least a portion of the extracted network cell identity based on the scrambling key.

3. The method of claim 2, further comprising:
   regularly receiving the scrambling key from the radio network controller.

4. The method of claim 2, further comprising:
   randomly receiving the scrambling key from the radio network controller.

5. The method of claim 2, wherein all parts of the identity are scrambled.

6. The method of claim 1, wherein the identity of the network cell extracted from the received system information comprises a radio network controller identifier (RNC-id) and a cell identifier (C-id).

7. The method of claim 1, wherein the changing step further comprises:
   generating at the base station a scrambling code; and
   scrambling the identity or the one of multiple parts of the identity of the network cell based on the scrambling code.

8. The method of claim 7, further comprising:
   monitoring a timer in the base station for determining when to change the scrambling code; and
   regularly changing the scrambling code.

9. The method of claim 7, further comprising:
   randomly changing the scrambling code.

10. The method of claim 1, further comprising:
    changing simultaneously identities of plural network cells.

11. The method of claim 10, further comprising:
    changing simultaneously identities of less than all plural network cells served by the base station.

12. The method of claim 1, further comprising:
    determining in the radio network controller of the telecommunication network when to change the identity of the network cell.

13. The method of claim 1, further comprising:
    repeating the above steps for each network cell controlled by the radio network controller.

14. The method of claim 1, further comprising:
    searching other network cells that are related to the current identity of the network cell in corresponding neighbor lists.

15. The method of claim 14, further comprising:
    replacing in those neighbor lists in the radio network controller that include the current identity of the network cell with the new identity; and
    replacing in cell configurations stored in the radio network controller the current identity of the network cell with the new identity.

16. A base station of a telecommunication network configured to prevent an external party to map an identity of a network cell of the telecommunication network with a corresponding geographical location of the network cell, the base station comprising:
    a communication interface configured to receive system information from a radio network controller of the telecommunication network; and
    a processor configured to,
    extract the identity of the network cell from the received system information,
    change the identity or one of multiple parts of the identity of the network cell, and
    send the changed identity or the one of multiple parts of the identity to a user terminal, wherein
    the processor is configured to change the identity or one of multiple parts of the identity of the network cell by implementing an instruction transmitted from the radio network controller, the instruction instructing the base station, which is controlled by the radio network controller and which controls the network cell, to replace a current second portion of the current identity with a new second portion of a new identity of the network cell generated by the radio network controller, wherein the new identity has multiple parts, and the radio network controller is configured to change the current identity of the network cell with the new identity.

17. The base station of claim 16, wherein the processor is further configured to:
    receive a scrambling key from the radio network controller; and
    scramble the identity or the one of multiple parts of the identity based on the scrambling key.

18. The base station of claim 16, wherein the processor is further configured to:
    generate at the base station a scrambling code, and
    scramble the identity or the one of multiple parts of the identity of the network cell based on the scrambling code.

19. A non-transitory computer readable medium including computer executable instructions, wherein the instructions, when executed, implement a method for preventing an external party to map an identity of a network cell of a telecommunication network with a corresponding geographical location of the network cell, the method comprising:
    receiving at a base station of the telecommunication network system information from a radio network controller of the telecommunication network;
    extracting, at the base station, the identity of the network cell from the received system information;
    changing, at the base station, the identity or one of multiple parts of the identity of the network cell; and sending the changed identity or the one of multiple parts of the identity to a user terminal, wherein the changing step comprises implementing an instruction transmitted from the radio network controller, the instruction instructing the base station, which is controlled by the radio network controller and which controls the network cell, to replace a current second portion of the current identity with a new second portion of a new identity of the network cell generated by the radio network controller, wherein the new identity has multiple parts, and the radio network controller is configured to change the current identity of the network cell with the new identity.

* * * * *